No. 637,635. Patented Nov. 21, 1899.
P. MERSCH.
MANTLE FOR ELECTRIC ARC LAMPS.
(Application filed Dec. 27, 1898.)
(No Model.)
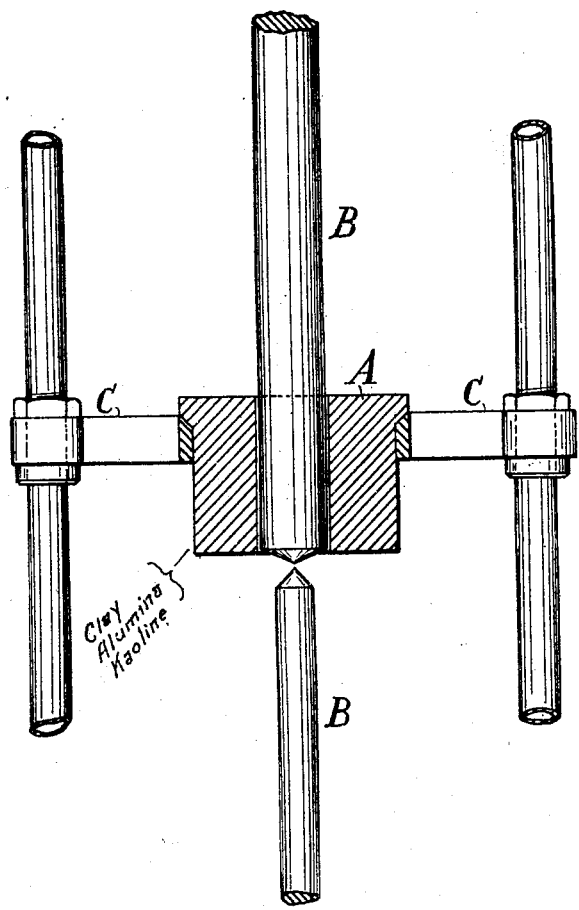

UNITED STATES PATENT OFFICE.

PAUL MERSCH, OF PARIS, FRANCE.

MANTLE FOR ELECTRIC-ARC LAMPS.

SPECIFICATION forming part of Letters Patent No. 637,635, dated November 21, 1899.

Application filed December 27, 1898. Serial No. 700,410. (No model.)

*To all whom it may concern:*

Be it known that I, PAUL MERSCH, doctor of jurisprudence and consul of the Grand Duchy of Luxemburg, a subject of the Grand Duke of Luxemburg, residing at 9 Avenue Hoche, Paris, France, have invented certain new and useful Improvements in Mantles for Electric-Arc Lamps; and I do hereby declare the following to be a full, clear, and exact description of the invention, such as will enable others skilled in the art to which it appertains to make and use the same.

My invention refers to mantles or cylinders of electric-arc lamps. The object of this mantle is to enhance the lighting power, the heat radiating from the arc being partly reflected on the carbon and partly absorbed by the same and making the mantle partly incandescent and at the same time giving the arc-light a milder or warmer tint. Moreover, the effect of oxygen of the air is diminished by the thus-produced greater rarefication of the air in the close neighborhood of the carbon electrode, whereby a longer life of the carbon is secured.

This mantle is preferably given a cylindrical shape, as shown in the drawing, in which A is the mantle, B the carbons for the arc-light, and C a device for holding the mantle. The latter consists, according to my invention, of plastic clay, which means a sedimentary product containing, besides silicate of alumina, free alumina, oxid of iron, and other impurities; further, alumina and kaolin, which consists in a nearly-pure silicate of alumina, being an immediate product of the decomposition of feldspar. In order to arrive at the desired effect to the necessary degree, this composition may, for instance, consist of four parts plastic clay, three parts alumina, and half part of kaolin. These substances are well mixed until the mixture is perfectly homogeneous. Then water is added gradually until the composition attains a paste-like consistency, whereupon it is brought into the desired shape and burned. The clay has the object to combine with the water and to give the composition the consistency. Alumina is highly refractory and prevents the clay from bursting. Kaolin and alumina enhance the effect of the light by their luster after heating. Also, the color of the light can hereby attain a softer or warmer tint. The heat radiating from the arc-light, otherwise lost, is hereby partly made use of. In order to arrive at the desired said effect, all three substances must be employed in the described manner. One of the substances alone does not give the effect aimed at.

The manipulation is very simple. The mantle is slid over the upper carbon and secured by suitable means—as, for instance, shown at C—in such manner that the carbon-point projects a few millimeters therefrom. The heat produced by the arc is partly absorbed by the mantle and partly reflected from the same, so that the carbon glows very brightly, and also the mantle becomes incandescent. The rarefication of the air produced thereby in the space between the carbon and the mantle or in the neighborhood of the carbon has the effect that the carbon is oxidized to a very small degree, so that the carbon may be used for a longer time than hitherto.

Having now particularly described my invention, what I claim, and desire to secure by Letters Patent, is—

1. A mantle for carbon electrodes consisting of a composition of clay, alumina and kaolin, substantially as described.

2. A burned mantle for carbon electrodes in electric-arc lamps, consisting of a composition of clay alumina and kaolin in substantially the proportions specified.

3. The herein-described method of making mantles for carbon electrodes in electric-arc lamps, the said method consisting in mixing alumina and kaolin with plastic clay to a homogeneous mixture, then adding water to it until the composition attains a paste-like plastic consistency, shaping the same into the desired form of the mantle for carbon electrodes, and then burning it.

4. A sleeve or cylinder adapted to engage around a carbon of an electric-arc lamp and consisting of a composition containing alumina and kaolin, substantially as described.

In testimony whereof I affix my signature in presence of two witnesses.

PAUL MERSCH.

Witnesses:
ERWIN L. GOLDSCHMIDT,
MAX. C. STAEHLER.